US006148492A

United States Patent [19]

Gaulden

[11] Patent Number: 6,148,492

[45] Date of Patent: Nov. 21, 2000

[54] EXTRACTOR FOR ARROWHEADS

[76] Inventor: Daren R. Gaulden, 1525 Lucas Rd., Unit F, Yreka, Calif. 96097

[21] Appl. No.: 09/438,168

[22] Filed: Nov. 11, 1999

[51] Int. Cl.[7] .................................................. B23P 19/04

[52] U.S. Cl. .................................................. 29/264; 29/263

[58] Field of Search .............................. 29/263, 264, 256, 29/235, 426.5

[56] References Cited

U.S. PATENT DOCUMENTS

| | | | |
|---|---|---|---|
| 4,194,278 | 3/1980 | Sanders | 29/264 |
| 4,920,625 | 5/1990 | Smith | 29/264 |
| 5,408,734 | 4/1995 | Mills et al. | 29/264 |
| 5,416,963 | 5/1995 | Boynton | 29/264 |
| 5,621,957 | 4/1997 | Herrera et al. | 29/264 |
| 5,682,660 | 11/1997 | Hansen | 29/264 |

*Primary Examiner*—David A. Scherbel
*Assistant Examiner*—Daniel G. Shanley

[57] ABSTRACT

An extractor for arrowheads including a fork in a generally C-shaped configuration having two spaced parallel prongs with forwardly extending ends and with a base coupling the prongs in spaced relationship. The base is formed with a central first aperture parallel with and intermediate the prongs and with a transverse threaded second aperture coupling the primary aperture with one side face. A threaded set screw is located within the threaded aperture of the base and extends through the first aperture of the base. A handle has a bore there through. A rearward sleeve is positioned within the bore of the handle and has a central threaded bore there through. An elongated threaded rod extends through the forward sleeve and the rearward sleeve and is threadedly coupled thereto. The threaded rod is formed with a forward end located between the prongs with a threaded recess therein for threaded coupling and uncoupling with respect to a threaded portion of an arrowhead to be extracted.

1 Claim, 3 Drawing Sheets

EXTRACTOR FOR ARROWHEADS

BACKGROUND OF THE INVENTION

1. Field of the Invention

The present invention relates to a extractor for arrowheads and more particularly pertains to simplifying the construction and use of extractors for arrowheads.

2. Description of the Prior Art

The use of extractors for arrowheads of known designs and configurations is known in the prior art. More specifically, extractors for arrowheads of known designs and configurations heretofore devised and utilized for the purpose of improving the designs of extractors for arrowheads through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,826,471 to Orton et al., discloses a device for pulling arroheads from implantation in solid objects. U.S. Pat. No. 3,873,068 to Allen discloses an archer's accessory tool for removing embedded arrowheads. Lastly, U.S. Pat. No. 5,102,100 to Toncoso, Jr. discloses an archery arrowhead puller device.

While these devices fulfill their respective, particular objectives and requirements, the aforementioned patents do not describe an extractor for arrowheads that allows simplifying the construction and use of extractors for arrowheads.

In this respect, the extractor for arrowheads according to the present invention substantially departs from the conventional concepts and designs of the prior art, and in doing so provides an apparatus primarily developed for the purpose of simplifying the construction and use of extractors for arrowheads.

Therefore, it can be appreciated that there exists a continuing need for a new and improved extractor for arrowheads which can be used for simplifying the construction and use of extractors for arrowheads. In this regard, the present invention substantially fulfills this need.

SUMMARY OF THE INVENTION

In view of the foregoing disadvantages inherent in the known types of extractors for arrowheads of known designs and configurations now present in the prior art, the present invention provides an improved extractor for arrowheads. As such, the general purpose of the present invention, which will be described subsequently in greater detail, is to provide a new and improved extractor for arrowheads and method which has all the advantages of the prior art and none of the disadvantages.

To attain this, the present invention essentially comprises an extractor for arrowheads including a fork in a generally C-shaped configuration. The fork has two spaced parallel prongs in a generally triangular configuration with forwardly extending pointed ends. A generally rectangular base couples the prongs in spaced relationship. The base has a front face, rear face, and side faces. The base is formed with a central first aperture parallel with and intermediate the prongs. A transverse threaded second aperture couples the primary aperture with one side face. A forward sleeve is next provided. The forward sleeve is located within the first aperture of the base. A collar is provided in contact with the rear face of the base. The forward sleeve is provided with an unthreaded axial bore. An unthreaded radial bore in the forward sleeve is axially aligned with the second aperture of the base. A threaded set screw is provided. The set screw is located within the threaded aperture of the base and extends through the second aperture of the forward sleeve and into the first aperture of the base. A handle is provided. The handle has an enlarged gripping portion. The handle also has a forwardly extending projection. The handle is provided with an extended unthreaded bore in axial alignment with the bore of the forward sleeve. A rearward sleeve is provided. The rearward sleeve is positioned within the bore of the handle. The sleeve is provided with a central threaded bore in axial alignment with the bore of the forward sleeve. The rearward sleeve has a forwardly extending collar in rotatable sliding contact with the collar of the forward sleeve. Lastly provided is an elongated threaded rod. The rod extends through the forward sleeve and the rearward sleeve and is threadedly coupled thereto. The rod is formed with a forward end located between the prongs. A threaded recess is provided for threaded coupling and uncoupling with respect to a threaded portion of an arrowhead to be extracted. The threaded rod has an axial groove in alignment with the radial aperture of the forward sleeve. In this manner, the threaded rod is first coupled to the threaded portion of the arrow head to be extracted by the threaded recess. Thereafter, the first aperture of the fork with its forward sleeve, is slid over the threaded rod with the set screw located within the axial groove to preclude rotation therebetween but to allow axial movement of the threaded rod and arrow head outwardly with respect to the fork. Thereafter the bore of the handle, with its rearward sleeve is rotatably positioned over the free rearward end of the rod until the sleeve is in rotatable contact with the forward sleeve. Thereafter, continued rotation of the handle with its rearward sleeve, being in contact with the fork and its non-rotatable forward sleeve, will effect the axial rearward movement of the threaded rod and the arrow head to effect its removal.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved extractor for arrowheads which has all of the advantages of the prior art extractors for arrowheads of known designs and configurations and none of the disadvantages.

It is another object of the present invention to provide a new and improved extractor for arrowheads which may be easily and efficiently manufactured and marketed.

It is further object of the present invention to provide a new and improved extractor for arrowheads which is of durable and reliable constructions.

An even further object of the present invention is to provide a new and improved extractor for arrowheads which is susceptible of a low cost of manufacture with regard to both materials and labor, and which accordingly is then susceptible of low prices of sale to the consuming public, thereby making such extractor for arrowheads economically available to the buying public.

Even still another object of the present invention is to provide an extractor for arrowheads for simplifying the construction and use of extractors for arrowheads.

Lastly, it is an object of the present invention to provide a new and improved extractor for arrowheads including a fork in a generally C-shaped configuration having two spaced parallel prongs with forwardly extending ends and with a base coupling the prongs in spaced relationship. The base is formed with a central first aperture parallel with and intermediate the prongs and with a transverse threaded second aperture coupling the primary aperture with one side face. A threaded set screw is located within the threaded aperture of the base and extends through the first aperture of the base. A handle has a bore there through. A rearward sleeve is positioned within the bore of the handle and has a central threaded bore there through. An elongated threaded rod extends through the forward sleeve and the rearward sleeve and is threadedly coupled thereto. The threaded rod is formed with a forward end located between the prongs with a threaded recess therein for threaded coupling and uncoupling with respect to a threaded portion of an arrowhead to be extracted.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
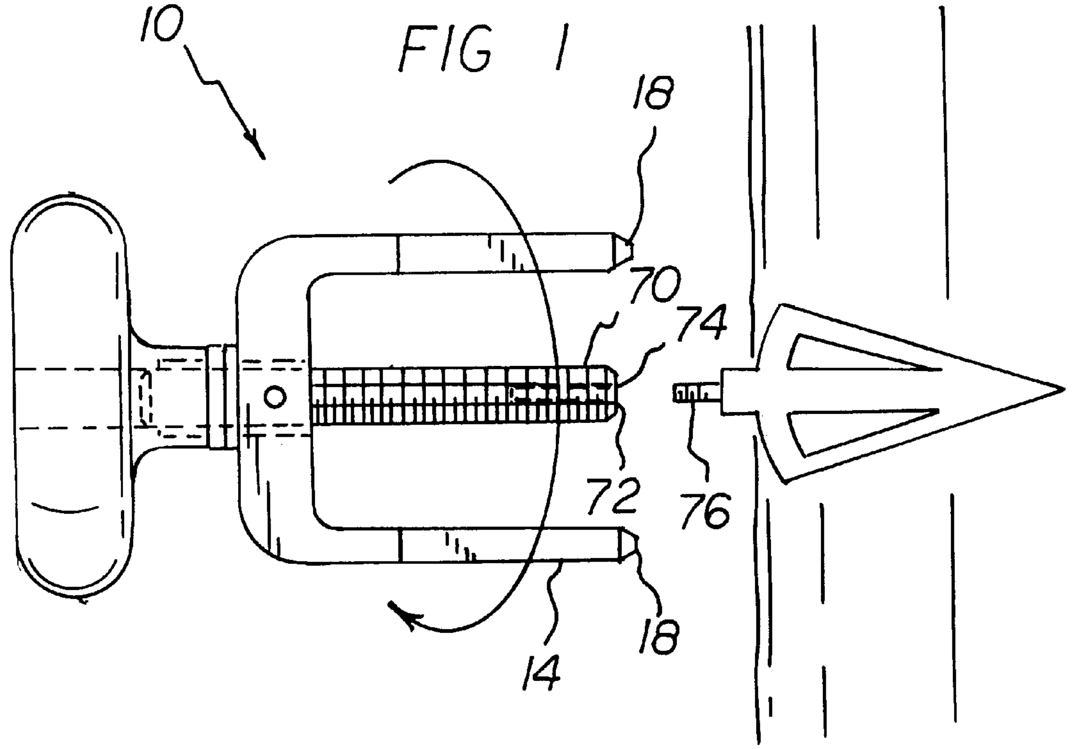
FIG. 1 is a side elevational view of the new and improved extractor for arrowheads constructed in accordance with the principles of the present invention.
Figure 2:
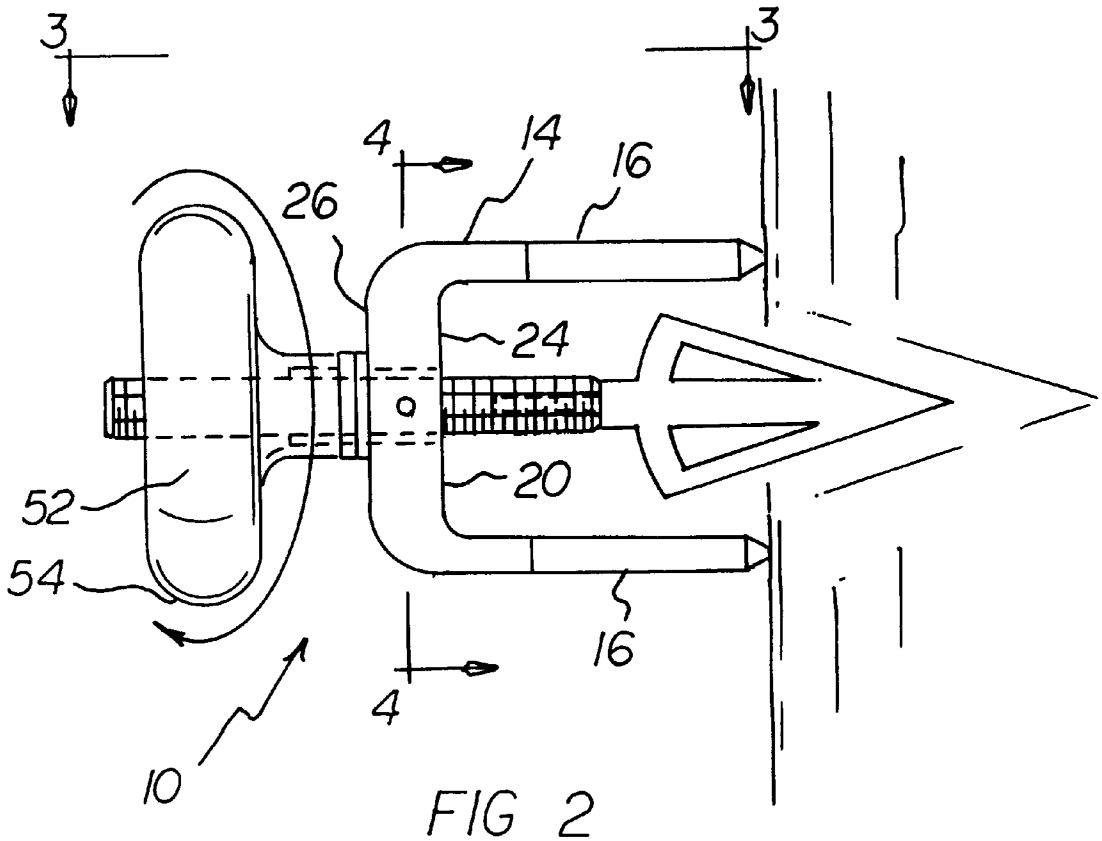
FIG. 2 is a view similar to FIG. 1 but illustrating the device after having been utilized.
Figure 3:
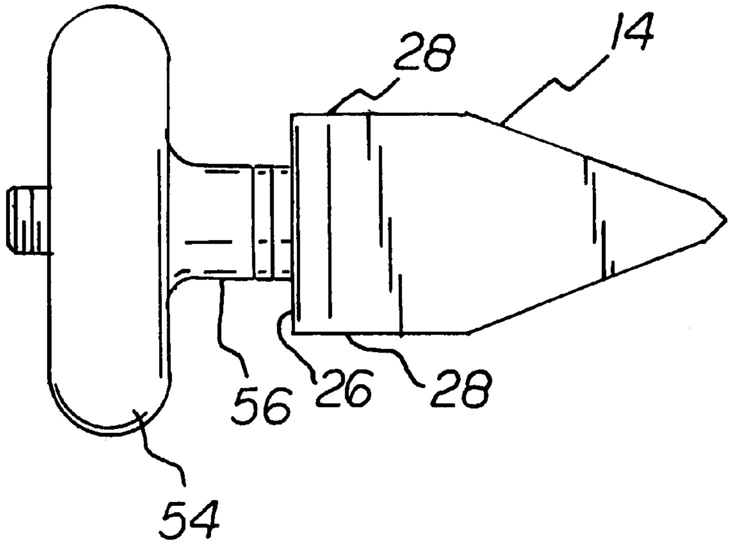
FIG. 3 is a top elevational view taken along line 3—3 of FIG. 2.
Figure 4:
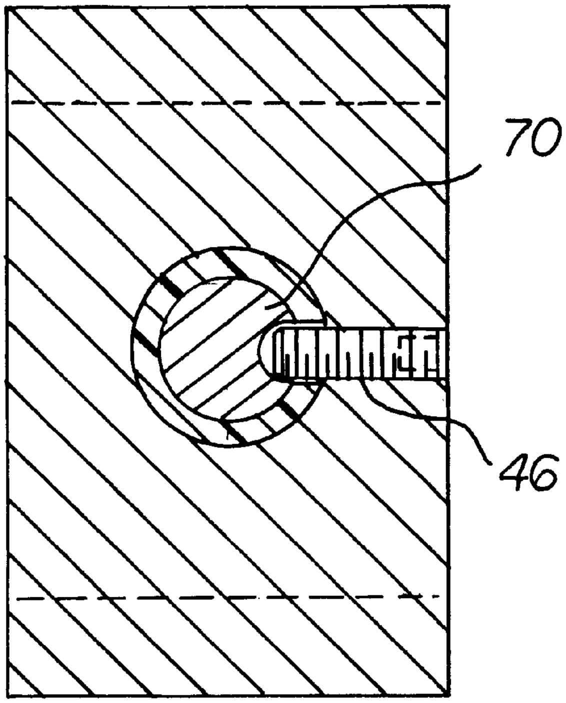
FIG. 4 is a cross sectional view taken along line 4—4 of FIG. 2.
Figure 5:
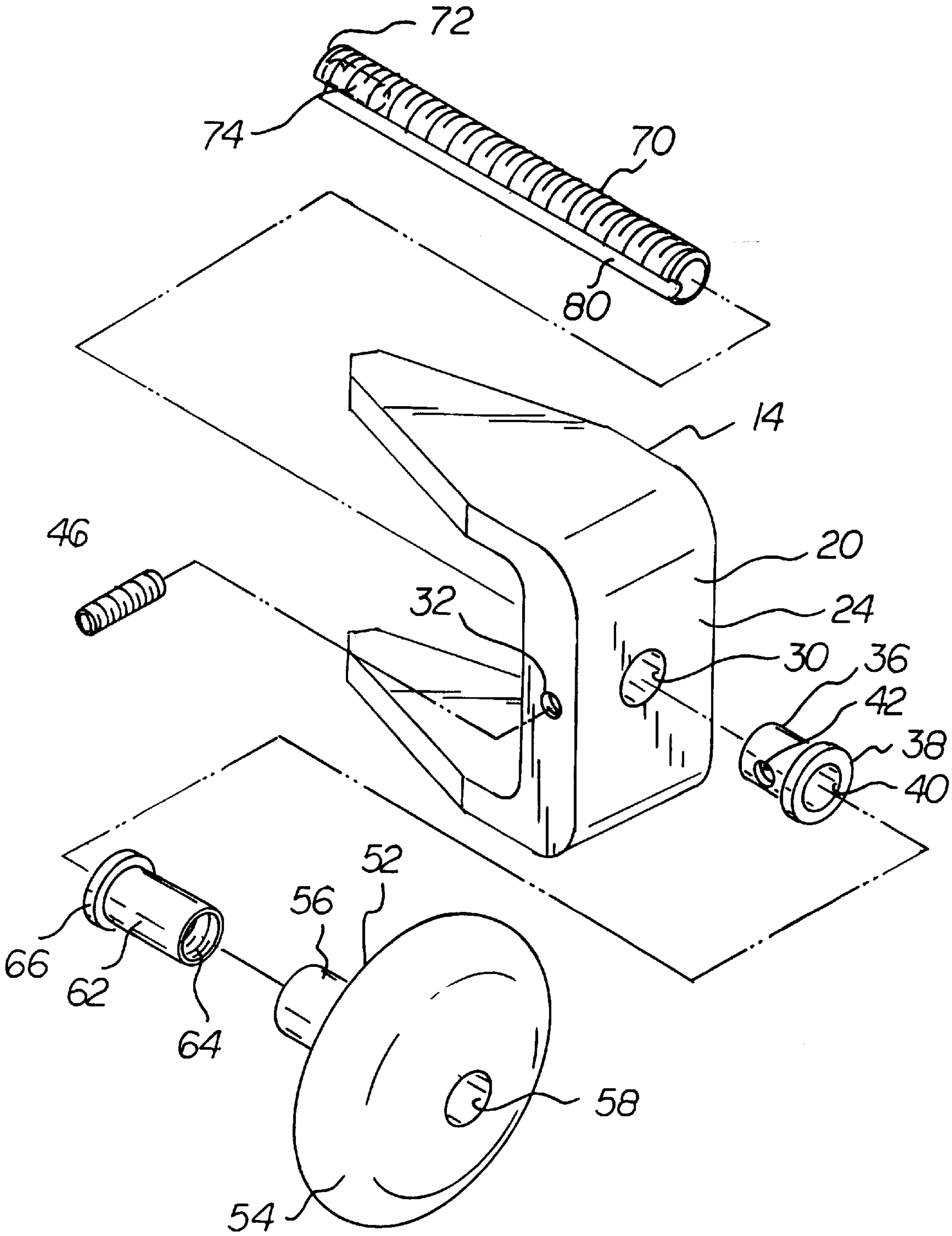
FIG. 5 is an exploded perspective view of the device shown in the prior Figures.

With reference now to the drawings, and in particular to FIG. 1 thereof, the preferred embodiment of the new and improved extractor for arrowheads embodying the principles and concepts of the present invention and generally designated by the reference numeral 10 will be described.

The present invention, the extractor 10 for arrowheads is comprised of a plurality of components. Such components in their broadest context include a fork, a threaded set screw, a handle, a rearward sleeve, and an elongated threaded rod. Such components are individually configured and correlated with respect to each other so as to attain the desired objective.

First provided is a fork 14 in a generally C-shaped configuration. The fork has two spaced parallel prongs 16 in a generally triangular configuration with forwardly extending pointed ends 18. A generally rectangular base 20 couples the prongs in spaced relationship. The base has a front face 24, rear face 26, and side faces 28. The base is formed with a central first aperture 30 parallel with and intermediate the prongs. A transverse threaded second aperture 32 couples the primary aperture with one side face.

A forward sleeve 36 is next provided. The forward sleeve is located within the first aperture of the base. A collar 38 is provided in contact with the rear face of the base. The forward sleeve is provided with an unthreaded axial bore 40. An unthreaded radial bore 42 in the forward sleeve is axially aligned with the second aperture of the base.

A threaded set screw is provided 46. The set screw is located within the threaded aperture of the base and extends through the second aperture of the forward sleeve and into the first aperture of the base.

A handle 52 is provided. The handle has an enlarged gripping portion 54. The handle also has a forwardly extending projection 56. The handle is provided with an extended unthreaded bore 58 in axial alignment with the bore of the forward sleeve.

A rearward sleeve 62 is provided. The rearward sleeve is positioned within the bore of the handle. The sleeve is provided with a central threaded bore 64 in axial alignment with the bore of the forward sleeve. The rearward sleeve has a forwardly extending collar 66 in rotatable sliding contact with the collar of the forward sleeve.

Lastly provided is an elongated threaded rod 70. The rod extends through the forward sleeve and the rearward sleeve and is threadedly coupled thereto. The rod is formed with a forward end 72 located between the prongs. A threaded recess 74 is provided for threaded coupling and uncoupling with respect to a threaded portion 76 of an arrowhead to be extracted. The threaded rod has an axial groove 80 in alignment with the radial aperture of the forward sleeve. In this manner, the threaded rod 70 is first coupled to the threaded portion 76 of the arrow head to be extracted by the threaded recess 74. Thereafter, the first aperture 30 of the fork 14 with its forward sleeve 36, is slid over the threaded rod 70 with the set screw 46 located within the axial groove 80 to preclude rotation therebetween but to allow axial movement of the threaded rod and arrow head outwardly with respect to the fork 14. Thereafter the bore 58 of the handle 52, with its rearward sleeve 62 is rotatably positioned over the free rearward end of the rod 70 until the sleeve 62 is in rotatable contact with the forward sleeve 36. Thereafter, continued rotation of the handle with its rearward sleeve, being in contact with the fork and its non-rotatable forward sleeve, will effect the axial rearward movement of the threaded rod and the arrow head to effect its removal.

The present invention functions by attaching directly to a threaded arrow tip or broadhead, which has become imbedded in an object, and jacking the tip along a center line axis for easy removal. The present invention can be used to remove screw-type arrow tips (including expensive broadheads) from game bones, targets, trees, etc. What is currently available for removing arrow tips is too heavy and bulky for the pack. The present invention will weigh under 5 ounces and fit easily into a pocket, pack or pouch. The present invention is to be machined of aluminum, or possibly a plastic. It consists of three main parts.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved extractor for arrowheads with simplified construction and use comprising, in combination:

a fork in a generally C-shaped configuration having two spaced parallel prongs in a generally triangular configuration with forwardly extending pointed ends and spaced openings there between and with a generally rectangular base coupling the prongs in spaced relationship, the base having a front face, rear face, and side faces and being formed with a central first aperture parallel with and intermediate the prongs and with a transverse threaded second aperture coupling the primary aperture with one side face;

a forward sleeve located within the first aperture of the base and a collar in contact with the rear face of the base, the forward sleeve having an unthreaded axial bore there through and an unthreaded radial bore axially aligned with the second aperture of the base;

a threaded set screw located within the threaded aperture of the base and extending through the second aperture of the forward sleeve and into the first aperture of the base;

a handle having an enlarged gripping portion and a forwardly extending projection and an extended unthreaded bore there through in axial alignment with the bore of the forward sleeve;

a rearward sleeve positioned within the bore of the handle and having a central threaded bore there through in axial alignment with the bore of the forward sleeve and with a forwardly extending collar in rotatable sliding contact with the collar of the forward sleeve; and an elongated threaded rod extending entirely through the handle and the forward sleeve and also extending entirely through the rearward sleeve and threadedly coupled thereto and formed with a forward end located between the prongs with a threaded recess therein for threaded coupling and uncoupling with respect to a threaded portion of an arrowhead to be extracted, the threaded rod having an axial groove in alignment with the radial aperture of the forward sleeve and the set screw whereby the threaded rod being first coupled to the threaded portion of the arrow head to be extracted by the threaded recess whereby the first aperture of the fork with its forward sleeve, being slid over the threaded rod with the set screw located within the axial groove to preclude rotational movement of the threaded rod with respect to the fork but to allow linear axial movement of the threaded rod throuah the forward sleeve and rearward sleeve and handle and arrow head outwardly with respect to the fork whereby the bore of the handle, with its rearward sleeve being rotatably positioned over the free rearward end of the rod until the sleeve being in rotatable contact with the forward sleeve whereby continued rotation of the handle with its rearward sleeve, being in contact with the fork and its non-rotatable forward sleeve, will effect the axial rearward movement of the threaded rod and the arrow head to effect its removal.

* * * * *